United States Patent [19]

Remmington et al.

[11] 4,038,354

[45] July 26, 1977

[54] PROCESS FOR EXTRUDING AND QUENCHING A POLYMERIC FILM

[75] Inventors: Timothy Alan Remmington, Hertford, England; William Robinson, Dumfries, Scotland

[73] Assignee: Imperial Chemical Industries Limited, London, England

[21] Appl. No.: 599,349

[22] Filed: July 28, 1975

[30] Foreign Application Priority Data

Aug. 7, 1974 United Kingdom .............. 34781/74

[51] Int. Cl.$^2$ .............................................. B29F 3/02
[52] U.S. Cl. ...................................... 264/102; 264/26; 264/176 R; 264/210 R; 264/216
[58] Field of Search ................... 264/24, 26, 101, 102, 264/216, 176, 210

[56] References Cited

U.S. PATENT DOCUMENTS

| | | | |
|---|---|---|---|
| 3,154,608 | 10/1964 | Aronsen | 264/101 |
| 3,223,757 | 12/1965 | Owens et al. | 264/216 |
| 3,374,303 | 3/1968 | Metz | 264/216 |
| 3,427,686 | 2/1969 | Busby | 264/24 |
| 3,520,964 | 7/1970 | Metz | 264/216 |
| 3,820,929 | 6/1974 | Busby et al. | 264/24 |

*Primary Examiner*—Donald J. Arnold
*Attorney, Agent, or Firm*—Cushman, Darby & Cushman

[57] ABSTRACT

Quenching molten polymeric films, especially polyester films, on casting surfaces by means of a combination of electrostatic and suction pinning.

8 Claims, 7 Drawing Figures

PROCESS FOR EXTRUDING AND QUENCHING A POLYMERIC FILM

The present invention relates to a process and apparatus for quenching extruded polymeric films.

Polymeric films are commonly made by extrusion from a slot die on to a rotating cooled casting drum where they are solidified into a form suitable for subsequent film making operations. In the case of certain crystallisable polymeric materials, such as polyethylene terephthalate, it is important to rapidly quench the extruded film to the amorphous state in order to minimise the onset of excessive crystallinity in the film which would cause embrittlement and interfere with subsequent film making operations. One method of achieving such quenching is to ensure that intimate contact is established between the film and the casting drum surface by depositing electrostatic charges upon the molten film before it reaches the casting drum and usually electrically earthing the casting drum. The electrostatic charges are attracted to the casting drum and establish the desired contact. Such a method is often termed "electrostatic pinning" and is described in British Pat. specification No. 911,528, the disclosure of which is incorporated herein by reference.

Electrostatic pinning has been used successfully in the production of linear polyester films under casting conditions and output rates available heretofore. However, at higher casting speeds, i.e. the speed of extrusion and rotation of the casting drum, which become of importance for economy of production, electrostatic pinning does not function quite so satisfactorily. One disadvantage is that bubbles become entrapped between the film and the casting drum surface with the result that thermal contact between the film and the casting drum surface is impaired thereby reducing the casting efficiency. The entrapped bubbles also tend to cause irregularities in the surface of the quenched film. Several proposals for casting at high speed in association with electrostatic pinning have been disclosed.

British pat. specification No. 1,310,604 discloses a process of high speed casting in which the electrostatic pinning is restricted to the edges of the molten film as it is deposited on a casting drum and an air current is applied across the complete film width to urge the film into contact with the casting drum. Further aspects of apparatus suitable for electrostatically pinning film edges are disclosed in U.S. pat. specification Nos. 3,758,251 and 3,779,692.

British patent specification 1 309 664 relates to an electrostatic pinning apparatus in which the electrical field producing the pinning charges is established between two electrodes, one maintained at a high voltage potential and the other being electrically earthed.

British pat. specification No. 1,309,449 describes another form of electrostatic pinning apparatus in which the pinning electrode is surrounded by a gas and the pinning conditions employed are such that no spark breakdown occurs.

Another proposal for the avoidance of entrapped bubbles appears in British pat. specification No. 1,302,642 which discloses that the casting drum surface should be rough and have interconnecting pits.

In a further proposal, disclosed in British pat. specification No. 1,333,133, a fluid bearing is positioned between the extrusion die and the touchdown of the film on to the casting drum to displace the film from its normal catenary path to the path which is nearer to perpendicular to the casting drum surface.

The above proposals involve complex modifications to the casting and pinning apparatus and the conditions for its operation.

Other means of casting polymeric films on to casting surfaces which operate without the use of electrostatic pinning have been disclosed in the art. British pat. specification Nos. 946,097 and 1,066,493 disclose that a vacuum should be applied to a sealed chamber located between the molten film and the casting surface.

None of the prior art references mentioned above relates to the essential combination of electrostatic pinning and suction taught by the present application.

According to the present invention a process for extruding and quenching a polymeric film comprises extruding a molten polymeric film on to an electrically earthed moving casting surface, said casting surface moving at a linear speed greater than the speed at which bubbles can be prevented from being entrapped between the molten polymeric film and the casting surface when electrostatic pinning is employed alone, depositing electrostatic charges upon part or the whole of the molten film width by means of an electrostatic pinning electrode supported in space relation to the molten film in the proximity of or prior to the region of first contact of the film with the casting surface, and applying suction to the space bounded by the path of the molten film prior to its first contact with the casting surface and that part of the moving casting surface prior to the region of first contact with the molten film, the deposited electrostatic charges and the suction operating in combination to adhere the molten film to the casting surface.

The invention also relates to an apparatus for extruding and quenching a polymeric film, which comprises an electrically earthed movable casting surface arranged to receive the extruded polymeric film, an electrostatic pinning electrode supported in space relation to the path of the molten film in the proximity of or prior to the region of first contact of the film with the casting surface, and means for applying suction to the space bounded by the path of the molten film prior to its first contact with the casting surface and that part of the casting surface prior to the region of first contact with the molten film.

The present invention may be used for the quenching of all polymeric materials which are capable of being formed in a flat self-supporting film by extrusion and quenching, e.g. polystyrene, polyamides, polymers and copolymers of vinyl chloride, polycarbonate, polymers and copolymers of olefines such as polypropylene, and polyesters of dibasic aromatic carboxylic acids with divalent alcohols. Polyester films which may be quenched according to this invention may be produced by condensing one or more dicarboxylic acids or their lower alkyl diesters, e.g. terephthalic acid, isophthalic acid, phthalic acid, 2,5-, 2,6- and 2,7-naphthalene dicarboxylic acid, succinic acid, sebacic acid, adipic acid, azelaic acid, diphenyl dicarboxylic acid, and hexahydroterephthalic acid, or bis-p-carboxyl phenoxy ethane, optionally with a monocarboxylic acid, such as pivalic acid, with one or more alkylene glycols, e.g. ethylene glycol, 1,3-propanediol, 1,4-butanediol, neopentyl glycol and 1,4-cyclohexane-dimethanol. The invention is particularly suitable for the quenching of molten polyethylene terephthalate films. The films quenched according to this invention may contain conventional additives such as particulate fillers added, for example, for slip or surface matting properties, anti-static agents, dyes and pigments. The invention is also suitable for the quenching of composite films comprising two or more polymeric layers.

The moving casting surface may take any convenient form such as a moving metal band or a rotating cylindrical metal drum, the latter being preferred. The casting surface may be highly polished to enable the quenched film to be separated and stripped from it and may be cooled to the appropriate quenching temperature by means of cooling fluids. In the case of a casting drum, the cooling fluid, e.g. water, may be circulated through the drum internally.

The combination, according to this invention, of electrostatic pinning and suction is essential to satisfactory quenching with the avoidance of entrapped bubbles at higher casting surface speeds, i.e. at speeds greater than the speed at which bubbles can be prevented from being entrapped when electrostatic pinning alone is employed. The speed at which bubbles cannot be prevented from being entrapped depends on the characteristics of the quenching apparatus and the conditions employed for electrostatic pinning. Thus, for casting surfaces in the form of a cylindrical drum, the speed at which bubbles cannot be prevented depends, inter alia, on the diameter of the drum and the incidence of bubbles occurs at slower peripheral drum speeds as the diameter of the drum increases. Accordingly, the combination of electrostatic pinning and suction becomes essential at slower drum speeds for larger diameter drums than for smaller diameter drums. For a given casting surface, the actual speed at which bubbles cannot be prevented from being entrapped using electrostatic pinning alone is influenced by the setting of the apparatus and especially the pinning voltage and the positioning of the pinning electrode relative to the molten film. Such adjustment of the electrostatic pinning equipment is well understood in the art and the greatest speed at which a given apparatus can be operated satisfactorily without the occurence of pinner bubbles can be readily determined by the skilled man in the art.

For most casting assemblies employing rotating casting drums, the speed at which the combination of electrostatic pinning and suction becomes essential will exceed 50 feet/minute and generally 100 feet/minute. For typical casting apparatus, the inventive combination will become essential at speeds exceeding about 150 feet/minute.

According to this invention the electrostatic pinning charges may be applied across part or the whole of the film width. When applied to only part of the film width, the charges are preferably applied to the edge margins of the film by means of suitably located pinning electrodes at each edge of the film. The electrodes in such an arrangement may consists of one or more point probes or wire electrodes suitably arranged or insulated that they only deposit charges on the edge margins of the film. Alternatively and preferably, the electrostatic pinning electrode is arranged to deposit electrostatic charges across the whole width of the molten film and is preferably in the form of a fine wire extending transversely across the casting surface, although sharp electrodes of other form, e.g. knife edges or a multiplicity of sharpened points, may be employed if desired.

Preferably, the electrostatic pinning electrode is located so that the electrostatic charges are deposited on the side of the molten film other than the side which comes into contact with the casting surface. However, if desired, it is possible to locate the electrostatic pinning electrode to deposit charges on the side of the molten film which does come into contact with the casting surface.

When a wire pinning electrode is employed, the wire may have a diameter of up to 0.030 inch, and may for example have a diameter of about 0.007 inch. The wire may be a stainless steel or tungsten wire and located from 0.1 to 0.5 inch from the molten film.

The conditions employed for electrostatic pinning may be those conventionally employed, e.g. as described in British pat. specification No. 911,528. Thus, the electrostatic pinning electrode may be maintained at a high potential relative to the earthed casting surface by connection to a direct current voltage supply, the other terminal of the supply also being earthed. A suitable supply provides a voltage in the range 2 to 30 kilovolts and a current of 0.3 to 50 milliamperes, preferably up to 5 milliamperes. A typical supply comprises a voltage of about 5 kilovolts and a current of about 2 milliamperes.

Alternatively, the pinning electrode may be connected to an alternating supply, as disclosed in German application No. 2,405,863, comprising a voltage of symmetrical or asymmetrical waveform exceeding 4.0 kilovolts peak to peak and having a frequency not exceeding that at which positive and negative electrostatic charges emitted by the electrode are unable to cross the space between the electrode and the molten film before the polarity of the voltage on the electrode charges.

The suction or partial vacuum may be established in an enclosed chamber formed by the molten film and the part of the moving casting surface preceding the region of first contact of the film with the casting surface and an enclosing housing which may be connected to a suitable suction pump. However, it has been found that a chamber is not essential to the operation of this invention and that a suitably located suction knife is adequate to establish the desired level of suction or partial vacuum. Such a suction knife may have a slot orifice measuring from 0.06 to 1.5 inch in its narrower dimension and extending substantially across the width of the film or beyond the width of the film and having a housing communicating with a suction pump. Preferably, the slot orifice is located between 0.06 and 3.5 inches from the molten web and between 0.06 and 3.0 inches from the casting surface so as to establish a suction or partial vacuum in the space between the molten film and the casting surface. A suction or partial vacuum in the region of 0.1 to 3.0 inches of water has been found sufficient to achieve satisfactory casting whilst avoiding bubbles being entrapped between the molten film and the casting surface. Preferably, the suction or partial vacuum may be up to 1.5 inch, preferably up to 1.0 inch and most preferably in the range 0.2 to 0.6 inch water.

According to one embodiment of the invention, the suction or partial vacuum may be applied solely in the space bounded by the moving casting surface and the molten film, e.g. by locating the slot orifice of a suction knife in the space. It has been observed that air may be drawn around the edges of the film into the suction or partial vacuum. The passage of the air across the edges of the film may become non-uniform and turbulent thus creating non-uniform cooling of the edge regions of the molten film. It has been found in some processes that this localised cooling may lead to edge imperfections and irregularities in the film. For example, such imperfections and irregularities may be exhibited by polyester films such as polyethylene terephthalate films quenched in this way, especially if the film is subsequently stretched longitudinally.

Such imperfections and irregularities may be reduced in another embodiment of this invention, in which means are provided for applying a suction or a partial vacuum substantially in the vicinity of the molten film edges and substantially transversely to the direction of movement of the casting surface. The transverse suction or partial vacuum may be applied by means of suction knives located in the vicinity of the molten film edges. The transverse suction or partial vacuum may equal or differ from that applied to the space between the moving casting surface and the molten film. Preferably, the transverse suction or partial vacuum is greater in magnitude than that applied between the moving casting surface and the molten film, which may have the magnitude hereinbefore specified, and in the range 1.5 to 5 inches of water.

The suction or partial vacuum may have a cooling effect upon the extrusion die as the result of the passage of air across the die and may result in local freezing of the molten polymer in the die. This problem may be avoided by shielding or thermally insulating those parts of the die which would otherwise be exposed to the suction or partial vacuum.

The use, according to this invention, or electrostatic pinning in combination with suction or partial vacuum facilities the satisfactory cooling and quenching of molten polymeric films without the need for the complex casting conditions and apparatus disclosed in the prior art references mentioned above which are concerned with high speed casting. The avoidance of entrapped bubbles enables the casting surface to operate at a high speed in the production of cast film of satisfactory quality. This is especially useful in the production of polyester films, such as polyethylene terephthalate films, at higher speeds.

In the absence of a suction or partial vacuum, the motion of the casting surface tends to drag the molten film away from the shortest path spanning the gap between the extrusion die and the casting surface. In a typical process, the extrusion die is arranged to extrude the molten film vertically and downwardly towards the casting surface, and at higher speeds the molten film follows a catenary path to the casting surface which is longer than the direct or shortest path to the casting surface. The reduction in film width, often termed "neck-in," increases as the path of the unsupported molten film increases. The application of a suction according to this invention serves to maintain the molten film approximately in the direct or shortest path thereby reducing the effect of neck-in.

An additional advantage in restraining the molten film approximately to the shortest path is that imperfections which might be imposed on the film surface by the die lips when the film is dragged out of the normal direction of extrusion at higher casting speeds are also reduced.

The cast films produced according to this invention may be subjected to any additional film-forming operations which are known in the art, such as stretching in one or more directions to effect molecular orientation followed optionally by heat setting. Such operations are disclosed for polyethylene terephthalate films in British pat. specification No. 838,708.

The invention is now further described with reference to the accompanying drawings, in which.

Figure 1:
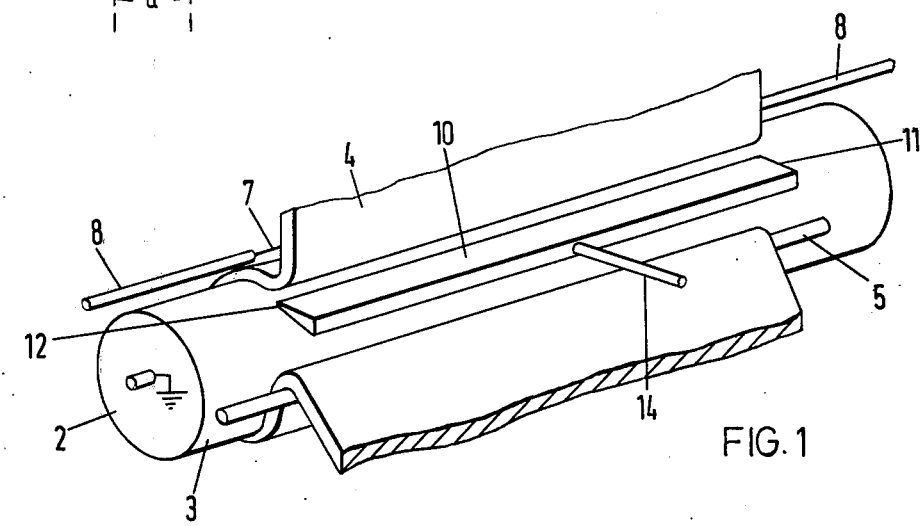
FIG. 1 is a perspective view of one embodiment omitting the extrusion die for simplicity.
Figure 2:
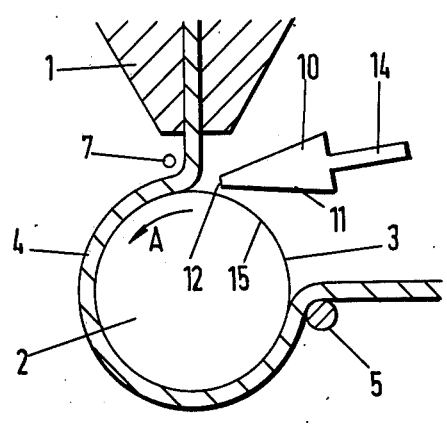
FIG. 2 is a cross-sectional view of the apparatus illustrated in FIG. 1.

The apparatus illustrated in FIGS. 1 and 2 is suitable for the casting of molten polyester films such as polyethylene terephthalate films, in relation to which the apparatus is described. The molten polyethylene terephthalate film 4 is extruded in a conventional manner through a film forming slot die 1, which is illustrated in FIG. 2, on to a conventional water-cooled steel casting drum 2 which is electrically earthed and has a polished casting surface 3. In operation, the casting drum 2 is rotated in the direction of the arrow A with peripheral speeds in the range 140 to 240 feet/minute so that the molten film 4 is laid continuously upon the casting surface 3 as it emerges from the die 1. After quenching, the film is stripped from the casting surface 3 by passage of a roller 5.

An electrostatic pinning wire electrode 7 extends transversely across the molten film and parallel to the axis of the casting drum 2. As shown in FIG. 1, tubular sleeve insulators 8 made of polytetrafluoroethylene electrically insulate the pinning wire 7 over the parts of the casting surface 3 which remain exposed beyond the edges of the cast film to prevent sparking between the pinning wire 7 and the casting surface 3 when the apparatus is in operation. The pinning wire 7 is located in the proximity of the region of first contact of the molten film 4 with the casting surface 3 and is connected to one terminal of a direct current power supply (not shown in the drawing) the other terminal being connected to earth. The power supply has an output of up to 20 kilovolts and up to 5 milliamperes such that electrostatic pinning charges are emitted and deposited upon the molten film 4 thereby contributing to its adhesion to the casting surface 3.

A suction knife 10 is located on the opposite side of the molten film 4 from the electrostatic pinning wire 7 and consists of a housing 11 having a slot orifice 12 which extends across the whole width of the molten film and a narrower dimension of 0.125 inch. The housing 11 communicates through a duct 14 with a suction pump (not shown in the drawing) by which a suction of up to 3 inches of water gauge can be applied to the housing. The slot orifice 12 of the suction knife 10 is located so as to apply a suction in the space bounded by the path of the molten film 4 between the die 1 and the moving casting surface 3 and the part 15 of the casting surface 3 prior to the region of first contact of the film with the casting surface 3. The slot orifice 12 is located approximately 2 inches from the molten film 4 and 1 inch from the casting surface 3.

Figure 3:
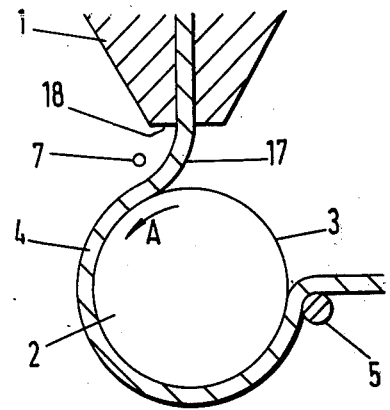
FIG. 3 is a cross-sectional view of an apparatus similar to that shown in FIGS. 1 and 2 but omitting the suction knife.

FIG. 3 illustrates the effect of operating the apparatus shown in FIGS. 1 and 2 without the suction knife 10. It is seen that, with both electrostatic pinning and partial vacuum in operation, as shown in FIG. 2, the molten film traverses approximately the shortest path between the die 1 and the casting surface 3, i.e. a path which is approximately perpendicular to the casting surface 3. When the suction knife 10 is not employed, as in FIG. 3, the molten film traverses a longer catenary path 17. As a result, the electrostatic pinning wire 7 must be located in a different position. The longer catenary path 17 imposes a greater transverse neck-in on the film than can arise when the film traverses the shorter path shown in FIG. 2. In addition, defects can be imposed on the film surface when casting is effected as shown in FIG. 3 especially by the die lip 18 which bears against the film surface.

Figure 4:
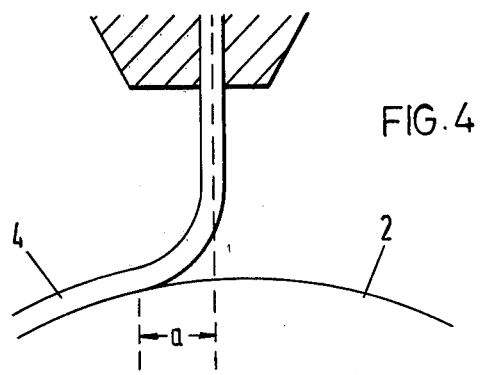
FIG. 4 is a cross-sectional view similar to FIG. 2 but on an enlarged scale and omitting the electrostatic pinning wire and the suction knife.

FIG. 4 illustrates the spacing between the extrusion die and the first contact of the molten film 4 with the casting drum 2. This spacing, designated $a$, corresponds to the distance, measured perpendicular to the central plane through the extrusion die, to the first contact of the molten film 4 with the casting drum 2.

Figure 5:
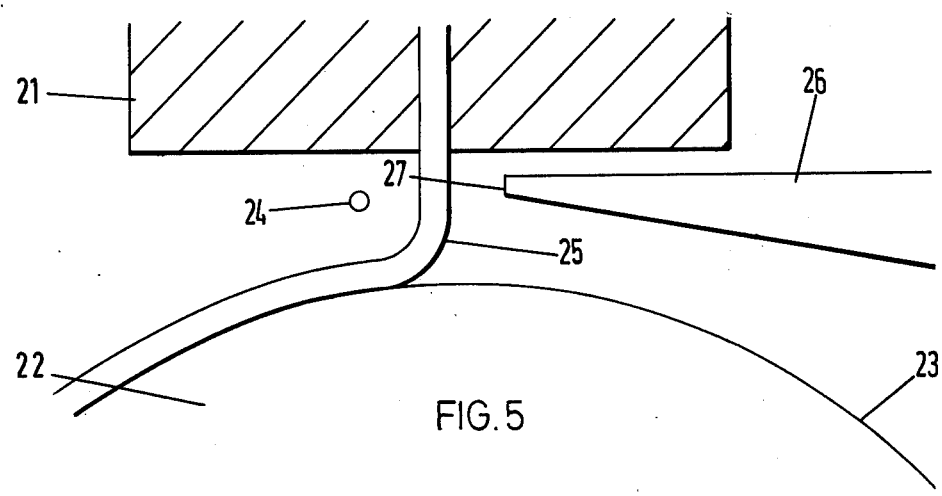
FIG. 5 is a cross-sectional view of an alternative embodiment.

FIG. 5 illustrates an apparatus, suitable for the casting of molten polyester films such as polyethylene terephthalate films, which has an alternative construction to that shown in FIG. 1. The apparatus comprises a film-forming slot die 21 and a water-cooled steel casting drum 22 having a polished casting surface 23. The casting drum 22 is electrically earthed to facilitate the electrostatic pinning of the molten film to the casting surface 23 by means of an electrostatic pinning wire electrode 24. Molten polymer 25 extruded through the die 21 is fixed to the casting surface 23 by the combined effect of electrostatic pinning and suction through a suction knife 26, the orifice 27 of which is located in the space bounded by the path of the molten polymer between the die 21 and the casting surface 23.

Figure 6:
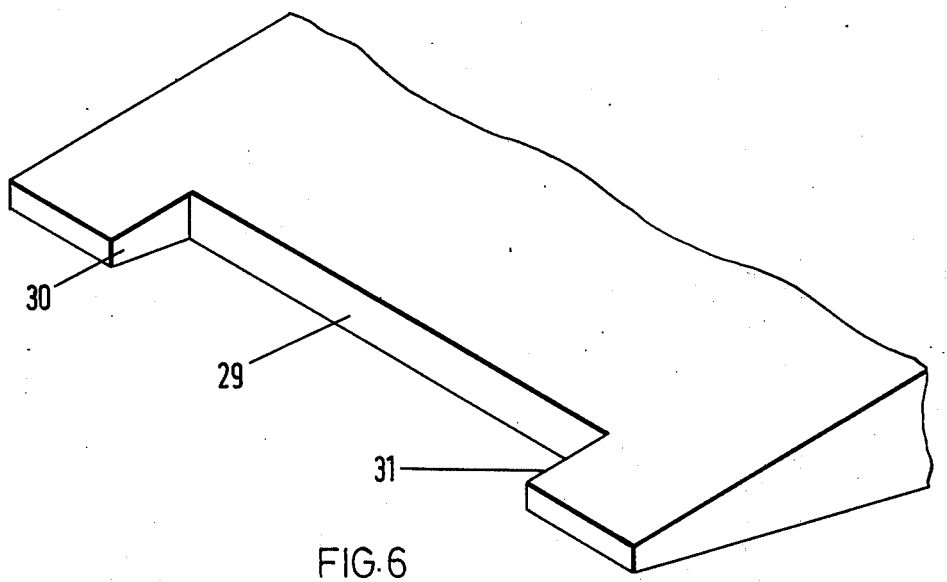
FIG. 6 is a perspective view of a suction knife having provision for transverse suction.

The suction knife illustrated in FIG. 6 has a main slot orifice 29 and two side orifices 30 and 31.

Figure 7:
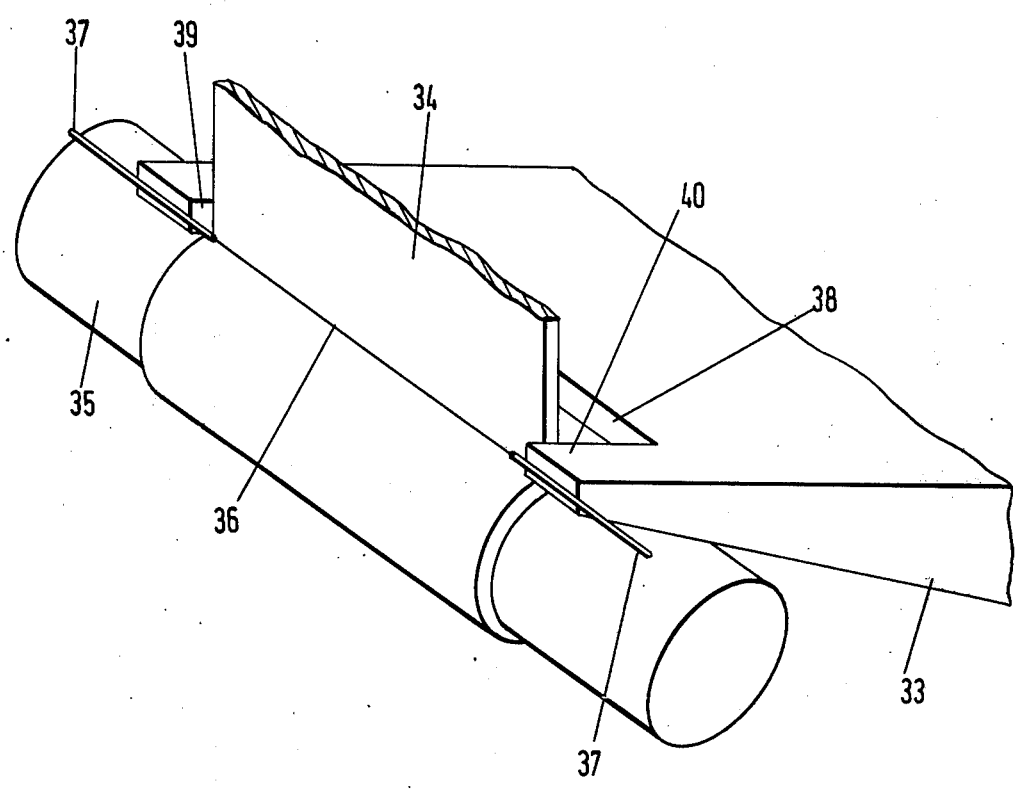
FIG. 7 is a perspective view of an apparatus incorporating a suction knife as illustrated in FIG. 6.

The apparatus illustrated in FIG. 7 comprises a suction knife 33 of the form illustrated in FIG. 6. A molten film of polyester 34, such as polyethylene terephthalate, is cast on to a water-cooled steel casting drum 35 having a polished casting surface. An electrostatic pinning wire electrode 36 is insulated at its ends by tubular sleeve insulators 37 made of polytetrafluoroethylene. The suction knife 33 is located so that the main slot orifice 38 applies a suction or a partial vacuum in the direction of rotation of the casting drum 35 and the side orifices 39 and 40 are positioned close to the edges of the molten film and establish a suction or partial vacuum in the vicinity of the film edges.

The invention is further illustrated by the following comparative examples and examples of the invention.

COMPARATIVE EXAMPLE A

Molten polyethylene terephthalate film was cast and quenched using the apparatus illustrated in FIG. 1 of the drawings. The casting drum had a radius $r$. The power supply was disconnected from the pinning wire 7 so that casting was effected solely under the influence of the suction imposed by the suction knife 10. The suction applied was 0.5 inch water gauge. At a casting drum peripheral speed of 100 feet/minute, fine machine direction corrugations were observed in the quenched film and were attributed to lateral slippage of the film on the casting drum. The corrugation defects were also encountered at other drum speeds. The quenched film was unsuitable for the production of commercially acceptable oriented and heat set film.

COMPARATIVE EXAMPLES B TO E

Molten polyethylene terephthalate film was cast and quenched using the same apparatus used in Comparative Example A and as illustrated in FIG. 1 of the drawings. The casting drum had a radius $r$. The suction knife 10 was disconnected from the suction pump so that casting was effected solely under the influence of electrostatic pinning. The incidence of entrapped bubbles under various conditions of production are noted in the following Table 1.

TABLE 1

| Comparative Example | Casting drum speed feet/minute | Pinning wire potential kilovolts | Pinning wire current milliamperes | Extrusion die to casting drum gap inch | Die to contact gap $a$ in FIG. 4 inch | Neck-in inches | Pinner bubbles |
| --- | --- | --- | --- | --- | --- | --- | --- |
| B | 150 | 6.0 | 1.45 | 0.44 | 1.0 | — | None |
| C | 180 | 6.0 | 1.5 | 0.44 | 1.0 | — | Fine bubbles |
| D | 200 | 6.0 | 1.6 | 0.44 | 1.25 | 2.2 | Moderate bubbles |
| E | 230 | 6.0 | 1.7 | 0.44 | 1.5 | 2.2 | Excessive bubbling |

It is seen from Table 1 that although no bubbles were entrapped at a casting drum speed of 150 feet/minute, fine bubbles were encountered at 180 feet/minute and bubbling became worse as the drum speed was increased. There was also substantial neck-in. The film produced under conditions which resulted in pinner bubbles exhibited surface imperfections resulting from the bubbles and was not suitable for the production of oriented end heat set film.

EXAMPLES 1 AND 2

Molten polyethylene terephthalate film was cast and quenched according to the invention with both electrostatic pinning and suction using the apparatus illustrated in FIG. 1 of the drawings. The casting drum had a radius $r$ and the slot die 1 had a length the same as that used in Comparative Examples B to E.

The conditions of casting and quenching and the resulting film characteristics are shown in Table 2.

TABLE 2

| Example | Casting drum speed feet/minute | Pinning wire potential kilovolts | Pinning wire current milliamperes | Suction inch of water gauge | Extrusion die to casting drum gap inch | Die to contact gap a in FIG. 4 inch | Neck-in inches | Pinner bubbles |
|---|---|---|---|---|---|---|---|---|
| 1 | 180 | 6 | 2.4 | 0.5 | 0.44 | 0.38 | 1.30 | None |
| 2 | 230 | 5 | 2.3 | 0.5 | 0.44 | 0.44 | 1.41 | None |

The film produced was of good quality. No pinner bubbles were entrapped between the molten film and the casting drum surface. The neck-in was less than that achieved in Comparative Examples D and E, the reduction being partly due to the shorter path of the molten film from the die to the casting drum (as illustrated by FIGS. 2 and 3) and partly because the die could be located closer to the quenching drum as a result of the stability imposed on the molten film by the suction.

The quenched film was subjected to molecular orientation and heat setting by conventional techniques to produce film of good quality.

COMPARATIVE EXAMPLE F AND EXAMPLES 3, 4 AND 5

Molten polyethylene terephthalate film was cast and quenched by electrostatic and suction means using the apparatus shown in FIG. 5 of the drawings. The die lip adjacent the suction knife 26 was thermally insulated against the cooling effect of the suction knife by locating a sheet of insulating material on the face of the die above the suction knife. Comparative Example F employed no suction. The casting and quenching conditions and the characteristics of the resulting film are shown in Table 3.

TABLE 3

| Example | Casting drum speed feet/minute | Pinning wire potential kilovolts | Pinning wire current milliamperes | Suction inch of water gauge | Extrusion die to casting drum gap inch | Neck-in inches | Pinner bubbles |
|---|---|---|---|---|---|---|---|
| F | 138 | 5 | 2.85 | — | 0.5 | 3.74 | None |
| 3 | 138 | 5 | 1.6 | 0.6 | 0.75 | 1.75 | None |
| 4 | 122 | 5 | 1.33 | 0.6 | 0.75 | 1.75 | None |
| 5 | 132 | 5 | 1.4 | 0.6 | 0.75 | 1.75 | None |

EXAMPLES 6, 7 AND 8

Molten polyethylene terephthalate film was cast and quenched by electrostatic and suction means using the apparatus shown in FIGS. 6 and 7 of the drawings. The suction knife employed had side orifices for the control of air passage across the edges of the cast film. The casting and quenching conditions and the characteristics of the resulting film are shown in Table 4.

TABLE 4

| Example | Casting drum speed feet/minute | Pinning wire potential kilovolts | Pinning wire current milliamperes | Suction at main orifice of air knife inch of water gauge | Suction at side orifices of air knife inch of water gauge | Extrusion die to casting drum gap inch | Neck-in inches | Pinner bubbles |
|---|---|---|---|---|---|---|---|---|
| 6 | 124 | 5 | 1.55 | 0.5 | 1.5 | 0.44 | 1.25 | None |
| 7 | 138 | 5 | 1.7 | 0.5 | 1.5 | 0.44 | 1.25 | None |
| 8 | 152 | 5 | 1.9 | 0.5 | 1.5 | 0.44 | 1.25 | None |

We claim:

1. A process for extruding and quenching a polymeric film, which comprises extruding a molten polymeric film on to an electrically earthed moving casting surface, said casting surface moving at a linear speed greater than the speed at which bubbles can be prevented from being entrapped between the molten polymeric film and the casting surface when electrostatic pinning is employed alone, depositing electrostatic charges upon part or the whole of the molten film width by means of an electrostatic pinning electrode supported in spaced relation to the molten film in the proximity of or prior to the region of first contact of the film with the casting surface, and applying suction to the space bounded by the path of the molten film prior to its first contact with the casting surface and that part of the moving casting surface prior to the region of first contact with the molten film, shortening the path of the molten film, the deposited electrostatic charges and the suction operating in combination to adhere the molten film to the casting surface, and to reduce the effect of neck-in.

2. A process according to claim 1, in which the film is a film of polyethylene terephthalate.

3. A process according to claim 1, in which the casting surface is a cylindrical drum rotatable at speeds exceeding 150 feet/minute.

4. A process according to claim 1, in which the suction is provided by a suction knife.

5. A process according to claim 4, in which the suction knife has a slot orifice located between 0.06 and 3.5 inches from the molten web and between 0.06 and 3.0 inches from the casting surface.

6. A process according to claim 1, in which the suction applied is in the range from 0.1 to 3.0 inches of water.

7. A process according to claim 1, in which suction or a partial vacuum is applied substantially in the vicinity of the molten film edges and substantially transversely to the direction of movement of the casting surface.

8. A process according to claim 7, in which the transverse suction or partial vacuum is greater in magnitude than that applied between the moving casting surface and the molten film.

* * * * *